US012760401B2

(12) United States Patent
Mehr et al.

(10) Patent No.: US 12,760,401 B2
(45) Date of Patent: Oct. 13, 2026

(54) COMPONENTS HAVING COATING SYSTEMS COMPRISING HIGHLY POROUS LAYERS AND METHODS FOR FORMING THE COATING SYSTEMS

(71) Applicant: HONEYWELL INTERNATIONAL INC., Charlotte, NC (US)

(72) Inventors: Mehrad Mehr, Morris Plains, NJ (US); Bahram Jadidian, Morris Plains, NJ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 242 days.

(21) Appl. No.: 18/461,099

(22) Filed: Sep. 5, 2023

(65) Prior Publication Data

US 2025/0075303 A1 Mar. 6, 2025

(51) Int. Cl.

| | |
|---|---|
| ***C23C 4/18*** | (2006.01) |
| ***C23C 24/04*** | (2006.01) |
| ***C23C 24/10*** | (2006.01) |
| ***C23C 28/00*** | (2006.01) |
| ***F01D 5/28*** | (2006.01) |

(52) U.S. Cl.

CPC ................ *C23C 4/18* (2013.01); *C23C 24/04* (2013.01); *C23C 24/10* (2013.01); *C23C 28/3455* (2013.01); *C23C 28/36* (2013.01); *F01D 5/28* (2013.01); *F05B 2230/90* (2013.01); *F05C 2253/12* (2013.01)

(58) Field of Classification Search

CPC ............. C23C 4/18; C23C 4/04; C23C 24/10; C23C 28/36; C04B 38/0615; C04B 35/16; C04B 37/003; B32B 18/00

See application file for complete search history.

(56) References Cited

U.S. PATENT DOCUMENTS

| | | | |
|---|---|---|---|
| 6,412,541 | B2 | 7/2002 | Roesler et al. |
| 7,563,504 | B2 | 7/2009 | Mazzola et al. |
| 10,669,213 | B2 | 6/2020 | Tholen et al. |

(Continued)

FOREIGN PATENT DOCUMENTS

| | | | | |
|---|---|---|---|---|
| EP | 1481747 | A2 | 12/2004 | |
| EP | 2789804 | A1 * | 10/2014 | ............ F01D 11/122 |

(Continued)

OTHER PUBLICATIONS

Tang Xinyue et al; "Design and formulation of polyurethane foam used for porous alumina ceramics"; Journal of Polymer Research, Springer, Netherlands, Dordrecht, vol. 25, No. 6, May 8, 2018, pp. 1-10, XP036497654.

*Primary Examiner* — Daniel Mcnally

(74) *Attorney, Agent, or Firm* — Ingrassia, Fisher & Lorenz LLP

(57) ABSTRACT

Components for a gas turbine engine and method for producing the components are provided. The components may include a substrate and a thermal barrier coating (TBC) having at least a first layer secured to a surface of the substrate. The first layer is formed of a ceramic material with a first microstructure that includes a plurality of interconnected unit cells having struts that have a relative density of greater than 98 percent and a closed cell porosity of 10 percent or greater. The TBC is secured to the substrate subsequent to formation of the TBC.

19 Claims, 4 Drawing Sheets

(56) References Cited

U.S. PATENT DOCUMENTS

| | | | | |
|---|---|---|---|---|
| 2003/0207155 | A1* | 11/2003 | Morrison | B32B 18/00 428/699 |
| 2009/0311508 | A1 | 12/2009 | Stamm | |
| 2021/0188723 | A1* | 6/2021 | Golden | C04B 41/0072 |
| 2021/0340069 | A1 | 11/2021 | Le Biez et al. | |

FOREIGN PATENT DOCUMENTS

| | | | | |
|---|---|---|---|---|
| EP | 3080336 | B1 | 11/2019 | |
| WO | WO-9745381 | A1 * | 12/1997 | C04B 38/06 |

* cited by examiner

COMPONENTS HAVING COATING SYSTEMS COMPRISING HIGHLY POROUS LAYERS AND METHODS FOR FORMING THE COATING SYSTEMS

TECHNICAL FIELD

The present invention generally relates to coating systems, and more particularly relates to components and methods for coating the components to produce coating systems thereon that include highly porous microstructures.

BACKGROUND

The aircraft industry's overall goal of increased engine temperatures necessitates the use of advanced ceramics like silicon nitride and SiC/SiC composites in engine components such as shrouds. Despite the ability of such ceramics to withstand high temperatures, these components require environmental barrier coatings (EBC) to survive water vapor in the combustion environment. In addition, the drive for even higher operating temperatures may require thermal barrier coatings (TBC) to enhance silicon-based ceramic component survivability.

Hence, there is an ongoing desire for coating systems and methods for producing such coating systems capable of surviving increased engine temperatures. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method is provided that includes locating a first mixture within a mold cavity defined by inner surfaces of a mold, the first mixture including a ceramic material and a first polymeric foaming composition, retaining the first mixture within the mold cavity for a period of time sufficient to allow the first mixture to foam and cure and thereby produce a foam body having a shape defined by the mold cavity, performing a one or more heat treatments to remove non-ceramic materials from the foam body and sinter the ceramic material to produce a ceramic body, wherein a microstructure of the ceramic body is based on the first polymeric foaming composition, performing a machining process to modify a size and/or a shape of the ceramic body, and securing the ceramic body to a substrate of a component to define at least a portion of a thermal barrier coating (TBC) on the substrate. The component is configured to be installed in a gas turbine engine.

In various embodiments, a component for a gas turbine engine is provided that includes a substrate and a thermal barrier coating (TBC) having at least a first layer secured to a surface of the substrate. The first layer is formed of a ceramic material with a first microstructure that includes a plurality of interconnected unit cells having struts that have a relative density of greater than 98 percent and a closed cell porosity of 10 percent or greater. The TBC is secured to the substrate subsequent to formation of the TBC.

Furthermore, other desirable features and characteristics of the component and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, embodiments of the present disclosure include components that have a coating system fixed and/or bonded to a substrate thereof, and manufacturing methods for providing the components. In various embodiments, the component may be configured for use in a high temperature and/or high pressure environment, and the coating system may be a protective ceramic coating, such as an environmental barrier coating (EBC) and/or a thermal barrier coating (TBC). In various embodiments, the coating system of the components include at least one layer comprising a highly porous microstructure that includes a rare-earth silicate, such as but not limited to ytterbium monosilicate (YbMS, $Yb_2SiO_5$) and/or ytterbium disilicate (YbDS, $Yb_2Si_2O_7$). The coating systems may be capable of providing environmental and/or thermal protection at high temperatures, such as 2850° F. (about 1565° C.) or greater, such as 3100° F. (about 1705° C.) or greater.

The components are not particularly limited to any size, shape, or application. The components may be used in any industry including, but not limited to, the automobile industry, the aerospace industry, the transportation industry, the power generation industry, the mining industry, etc. The components may be particularly suitable for use in a high temperature and/or high pressure environments including, but not limited to, power plants, mining, petroleum and oil refining, fracking, under water applications, deep sea applications, etc. In various embodiments, the components may be any portion of a vehicle, aircraft, ship, train, etc. In some embodiments, the components may be any portion of an engine or a motor, such as used for propulsion of a vehicle, aircraft, ship, train, etc. In some embodiments, the components may be any portion of a gas turbine engine, such as an aircraft engine. A nonlimiting example includes a shroud for a gas turbine engine.

Figure 1:
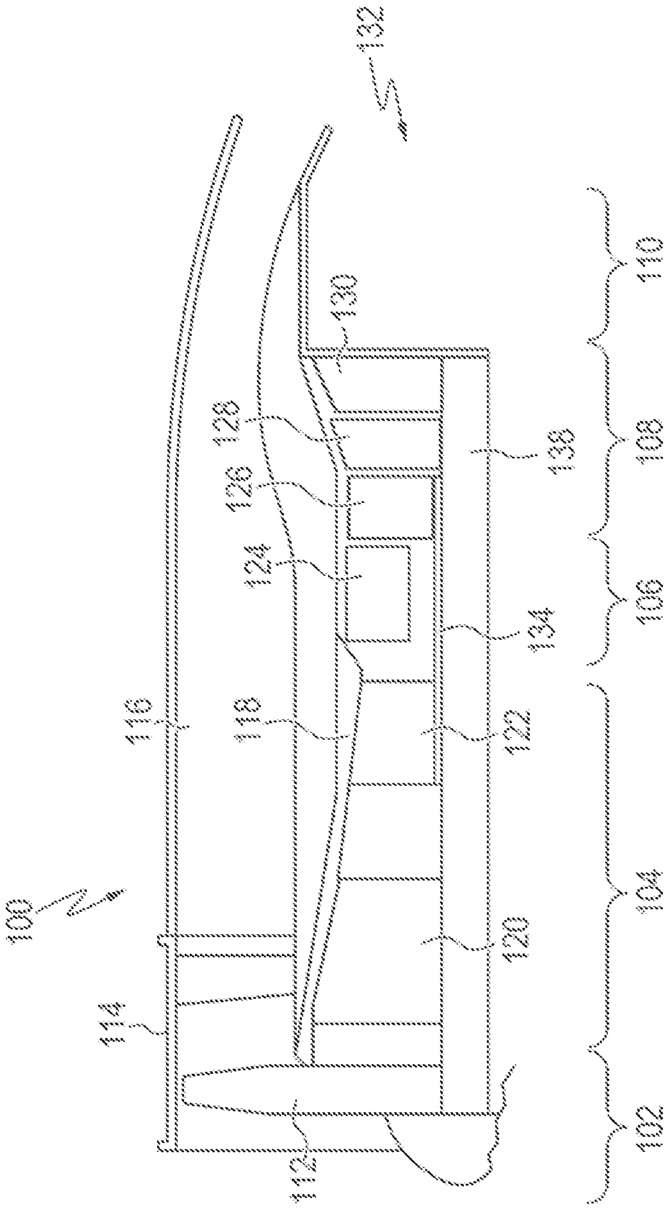
FIG. 1 is a schematic view of a gas turbine engine according to example embodiments of the present disclosure.

Referring to FIG. 1, a cross-sectional view of an exemplary turbofan gas turbine engine 100 is illustrated. In general, the gas turbine engine 100 includes a fan section 102, a compressor section 104, a combustion section 106, a turbine section 108, and an exhaust section 110. The fan section includes a fan 112 mounted on the low-pressure turbine shaft 138 and contained within a fan casing 114. The fan 112 induces air from the surrounding environment into the engine and passes a fraction of this air toward the compressor section 104. The compressor section 104 includes at least one compressor and, in the depicted embodiment, includes a low-pressure compressor 120 and a high-pressure compressor 122. The low-pressure compressor 120 raises the pressure of the air directed into it from the fan 112 and directs the compressed air into the high-pressure compressor 122. The compressors are mounted on turbine shafts 134 and 138 and contained within a compressor casing or shroud 118.

The combustion section 106 of gas turbine engine 100 includes a combustor 124 in which the high-pressure air from the high-pressure compressor 122 is mixed with fuel and combusted to generate a combustion gas. The combustion gas is then directed into the turbine section 108. The turbine section 108 includes a number of turbines disposed in axial flow series. The combustion gas from the combustion section 106 expands first through the high-pressure turbine 126, passes through the inter-turbine duct 128, and expands again through the low-pressure turbine 130, causing the turbine rotors to rotate at different speeds. As the turbines 126 and 130 rotate, each respectively drives equipment in the gas turbine engine 100 via concentrically disposed shafts or spools 134 and 138. The combustion mixture is then exhausted through the exhaust section 110.

The gas turbine engine 100 may include at least one component with a coated outer surface. The component may be included in an area of the gas turbine engine 100 subjected to high-temperature environments. The coated outer surface is defined by one or more layers of the coating system secured directly or indirectly (e.g., via underlying layers thereof) to surfaces of a substrate (i.e., an underlying layer or body). The substrate may be defined by a component body. The component body may define a majority of the component. The component body may have a variety of shapes without departing from the scope of the present disclosure.

In various embodiments, the component body and, thus the substrate, may be constructed of a ceramic material. The substrate may include or be a monolithic ceramic or a ceramic matrix composite. A ceramic is an inorganic solid that may include metals, non-metals, or metalloid atoms primarily held together with ionic and/or covalent bonds. Ceramics may be crystalline, semi-crystalline, partially crystalline, or amorphous. The substrate may include ceramic material throughout, such that the substrate is essentially 100 percent ceramic. Alternatively, the substrate may be defined as a substrate that includes a ceramic coating disposed over a non-ceramic (e.g., metallic) core. The substrate is not particularly limited in size, dimensions, etc.

The substrate may be or include any ceramic known in the art. For example, the substrate may be or include silicon nitride, silicon carbide, silicon-carbide-silicon carbide composites, silicon oxynitride, SiAlON materials (materials that include silicon, aluminum, oxygen, and nitrogen), silicon dioxide, and combinations thereof. In other embodiments, the substrate may be or include silicon nitride, silicon carbide, silicon-carbide-silicon carbide composites, or combinations thereof. In various embodiments, the substrate may be or include from about 50 to about 100 weight percent, or from about 80 to about 100 weight percent, or from about 99 to about 100 weight percent of silicon nitride, silicon carbide, silicon oxynitride, SiAlON materials, silicon dioxide, and combinations thereof. In various non-limiting embodiments, all values and ranges of values including and between those set forth above are hereby expressly contemplated for use herein.

The coating system may include a plurality of layers. In various embodiments, the coating system includes an environmental barrier coating (EBC) having one or more layers, and a thermal barrier coating (TBC) having one or more layers. In such embodiments, the EBC may serve as a barrier between the substrate and high temperature air or steam when operating in conditions wherein water vapor becomes a reactive species and causes erosion, and the TBC may have low thermal conductivity for thermally protecting the underlying EBC and the substrate. The EBC and the TBC may each include one or more layers. The EBC may be provided on an underlying surface, such as that of a substrate or another coating thereon, and the TBC may be provided on the EBC, if present. In some embodiments, the coating system omits the EBC and only includes the TBC. The layers of the coating system are not particularly limited in size, thickness, or other dimensions. In various embodiments, one or more of the layers of the coating system may have a thickness of from about 25 μm to about 1 mm, such as 1 mm or greater.

In various embodiments, the coating system includes a TBC having one or more layers formed of one or more ceramic materials. The TBC may be formed of or include various ceramic materials without departing from the scope of the present disclosure. In various embodiments, the TBC may include a rare earth silicate that may be or include at least one rare earth monosilicate (e.g., $RE_2SiO_5$, where RE is a rare earth element), at least one rare earth disilicate (e.g., $RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In various embodiments, the rare earth silicate is $Y_2SiO_5$, $Gd_2SiO_5$, $Er_2SiO_5$, $Yb_2SiO_5$, $Lu_2SiO_5$, $Y_2Si_2O_7$, $Gd_2Si_2O_7$, $Er_2Si_2O_7$, $Yb_2Si_2O_7$, or $Lu_2Si_2O_7$, or combinations thereof.

In various embodiments, the TBC may have a highly porous microstructure that includes a plurality of interconnected unit cells having cell walls or struts that have substantially 100% relative density, such as greater than 99 percent, such as greater than 98 percent. The TBC may have a closed-cell structure, an open-cell structure, or a combination thereof. In the closed-cell structure, the TBC primarily includes a plurality of discrete voids, each surrounded by a solid material (e.g., the ceramic material), whereas in the open-cell structure, the TBC primarily includes a plurality of interconnected voids. The TBC may have various porosities (i.e., percentage of voids), pore sizes, and pore size distributions. In various embodiments, one or more layers of the TBC may have a closed cell porosity of about 10 to 40 percent. In various embodiments, one or more layers of the TBC may have an open-cell porosity of 60 to 95 percent. In some embodiments, the TBC may have pore sizes in a range of 5 to 50 micrometers (μm). In some embodiments, the TBC has a minimum pore size of about 5 μm, 10 μm, 15 am, 20 μm, 25 μm, 30 μm, 35 μm, 40 μm, or 45 μm. In some embodiments, the TBC has a maximum pore size of about 50 μm, 45 μm, 40 μm, 35 μm, 30 μm, 25 μm, 20 μm, 15 μm, or 10 μm. In various embodiments, the TBC may have a porosity gradient through a thickness thereof. In some embodiments, the porosity gradient includes increasing porosity with increasing distance from the substrate.

Figure 2:
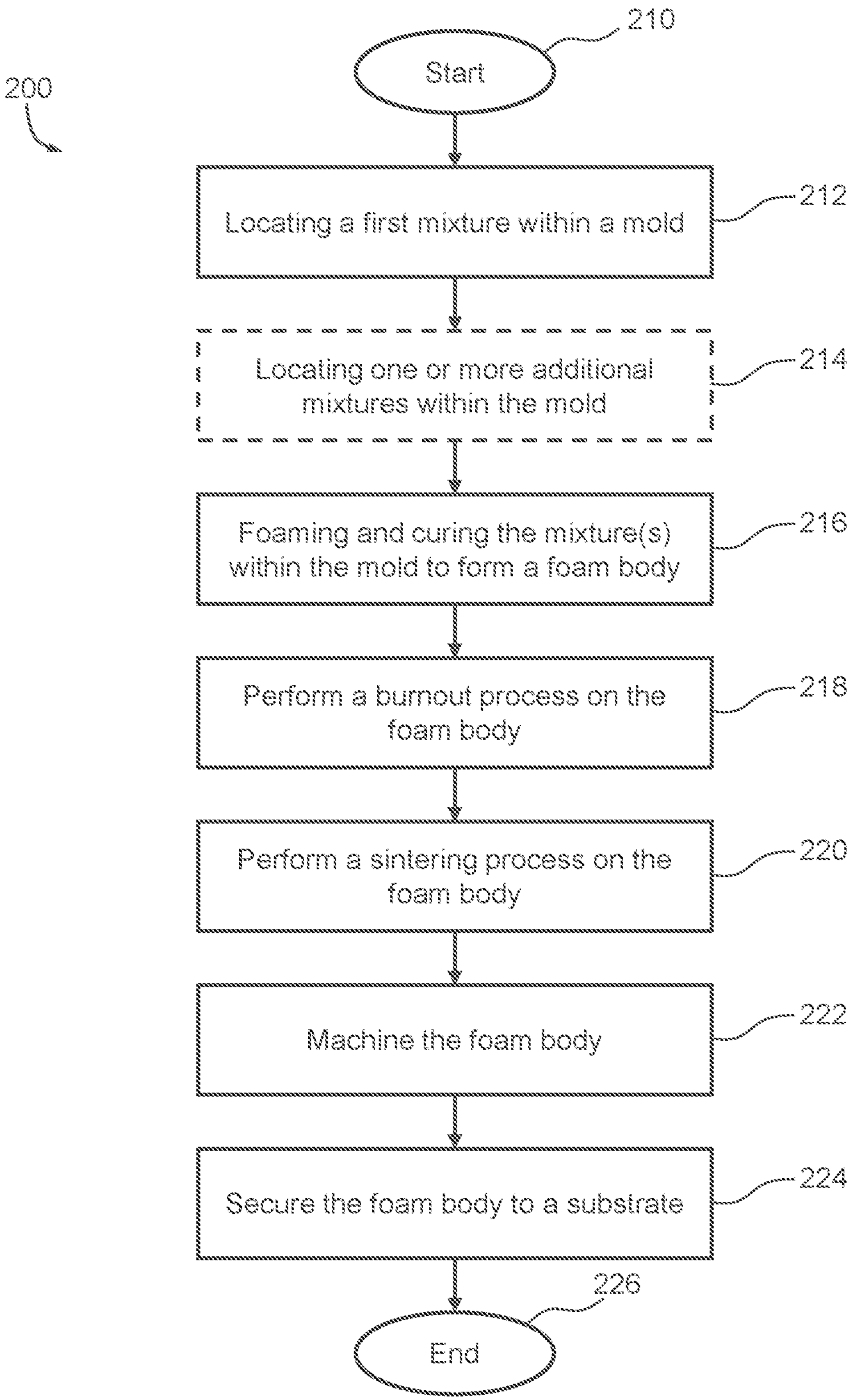
FIG. 2 is a flowchart illustrating certain aspects of a method for producing a coating system on a component according to example embodiments of the present disclosure.

The coating system may be formed and secured to the surface of the substrate by various processes. For examples, FIG. 2 is a flow chart illustrating an exemplary method 200 for forming the coating system and securing the coating system to the substrate of the component. The method 200 may start at 210.

At 212, the method 200 may include locating a first mixture within a mold. The first mixture may include at least one ceramic material configured to define one or more layers of the coating system, and at least one polymeric foaming composition configured to promote foaming of the first mixture during subsequent steps of the method 200.

In various embodiments, the ceramic material may include a rare earth silicate that may be or include at least one rare earth monosilicate (e.g., $RE_2SiO_5$, where RE is a rare earth element), at least one rare earth disilicate (e.g., $RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In various embodiments, the rare earth silicate is $Y_2SiO_5$, $Gd_2SiO_5$, $Er_2SiO_5$, $Yb_2SiO_5$, $Lu_2SiO_5$, $Y_2Si_2O_7$, $Gd_2Si_2O_7$, $Er_2Si_2O_7$, $Yb_2Si_2O_7$, or $Lu_2Si_2O_7$, or combinations thereof.

In various embodiments, the polymeric foaming composition may include one or more polymeric materials, such as a polymer resin or polyol, configured to function as a temporary base material for the foam body, In various embodiments, the polymeric material may be a thermoplastic or thermosetting polymer.

In various embodiments, the polymeric foaming composition may include one or more blowing agents configured to generate gas bubbles within the polymer/ceramic matrix to form the porous structure (i.e., foam body). In various embodiments, the blowing agent(s) may be chemical blowing agents configured to release gases upon reaction with other components of the polymeric foaming composition (e.g., water, enolizable organic compounds, polycarboxylic acid, boric acid, etc.) or may be physical blowing agents configured to release gases by vaporizing a volatile compound from the heat generated by the exothermic polymerization reaction (e.g., cyclopentane, npentane, liquified $CO_2$, methyl chloride hydrocarbons, and halogen-free azeotropes, etc.)

In various embodiments, the polymeric foaming composition may include one or more catalysts configured to accelerate the chemical reactions that lead to foaming. For example, the catalyst(s) may promote decomposition of chemical blowing agent(s) or a reaction between polyol(s) and isocyanate(s) in the case of polyurethane foams.

In various embodiments, the polymeric foaming composition may include one or more crosslinking agents and/or chain extenders configured to promote stability and mechanical properties of the foam body (e.g., glycerol, ethylene glycol, diamines, etc.).

In various embodiments, the polymeric foaming composition may include one or more surfactants, also known as foam stabilizers or surface-active agents, configured to promote stabilization the gas bubbles formed during foaming and prevent coalescence (e.g., silicone-based surfactants). The surfactant(s) may improve the foam's cell structure and homogeneity.

Other additives may be included in the first mixture to provide additional modifications to the foaming process and/or the resulting foam body.

In various exemplary embodiments, the polymeric foaming composition may be a polyurethane foaming composition. In such embodiments, the polyurethane foaming composition may include a polyol (e.g., polyether polyol, polyester polyol, etc.), an isocyanate (e.g., methylene diphenyl diisocyanate, toluene diisocyanate, etc.), blowing agent(s) (e.g., pentane, cyclopentane, or carbon dioxide), surfactant(s), catalyst(s) (e.g., tin-based catalysts like stannous octoate), curative(s) (e.g., cross-linkers or chain extenders), and/or additive(s). The polyol and isocyanate react to form a main polymer chain of the polyurethane foam. The blowing agent(s) are responsible for generating gas, creating the material's porous structure. The surfactant(s), catalyst(s), and curative(s) aid the polymer system in stabilizing and maintaining the desired rate of reaction. Additive(s) may be included to impart additional properties.

In various exemplary embodiments, the polymeric foaming composition may be a polyimide foaming composition. In such embodiments, the polyimide foaming composition may include polyimide resin(s), blowing agent(s), surfactant(s), catalyst(s), curative(s), and/or additive(s). The polyimide resins form a main polymer chain of the polyimide foam. The blowing agent(s), surfactant(s), catalyst(s), curative(s), and additive(s) function as previously described.

Various methods may be used to combine the various components of the first mixture. Such methods may depend on the specific polymer system and/or components of the first mixture. Therefore, the method used may be chosen by one of skill in the art.

In various embodiments, the first mixture is a flowable fluid and locating the first mixture in the mold cavity of the mold may include pouring or injecting the first mixture into the mold, for example, through a mixing head. In various embodiments, the mold may be pre-heated.

At 214, the method 200 may optionally include locating one or more additional mixtures within the mold. The additional mixture(s) may also include a ceramic material and a foaming composition. In various embodiments, two or more mixtures may be located within the mold such that the mixtures define substantially separate fluid layers within the mold cavity. Each of the mixtures may have different compositions. In various embodiments, the first and additional mixtures include the same ceramic material and different foaming compositions. In various embodiments, the first and additional mixtures include different ceramic materials and different foaming compositions. In various embodiments, the first and additional mixtures include different ceramic materials and the same foaming compositions. In various embodiments, the foaming compositions of the first and additional mixtures include different concentrations of sintering aids, wherein lower concentrations provide less dense microstructures that promote heat resistance and higher concentrations provide more dense microstructures that promote mechanical strength.

In various embodiments, the first mixture and/or the additional mixture(s) may include 20 to 40 percent by volume (vol. %) of the ceramic material and 60 to 80 vol. % of the polymeric foaming composition. In various embodiments, the first mixture and/or the additional mixture(s) may include 25 to 35 vol. % of the ceramic material and 65 to 75 vol. % of the polymeric foaming composition. All volume measurements are prior to foaming. As a nonlimiting example, the first mixture may include about 3.5 grams of YBDS for every 1.5 milliliters of the polymeric foaming composition.

At 216, the method 200 may include foaming the mixture(s) to fill the mold cavity and then curing the foamed mixture(s) within the mold to form a foam body (green body) having a polymer/ceramic matrix. In various embodiments, foaming the mixture(s) may include maintaining the mixture(s) within the mold cavity for a period of time sufficient to allow the components of the mixture(s) to react inside the mold causing the polymer system(s) to foam and rise. In various embodiments, the foaming process includes generating gas bubbles in the mold with one or more chemical and/or physical blowing agents and thereby foaming the mixture(s). In various embodiments, foaming the mixture(s) may include maintaining the mold at an elevated temperature. In various embodiments, the foaming and curing processes may be performed over a period of time of 8 hours or greater, such as 12 hours or greater, such as 24 hours or greater.

During the curing process, polymer chains within the polymer system react and cross-link to convert the flowable fluid mixture(s) to a solid tridimensional polymeric network. The curing process may occur with or without curing agents. In some embodiments, curing may be promoted or induced by application of heat, radiation, or electron beams. In embodiments that include locating more than one mixture within the mold (e.g., step 214), the foam body may include two or more layers of different compositions, structures, and/or properties. For example, the foam body may include a first layer having pore sizes in a range of 5 to 10 micrometers and a second layer having pore sizes in a range of 20 to 50 micrometers.

At 218, the method 200 may include performing drying and/or burn out processes. In some embodiments, a heat treatment may be performed to dry the foam body. In some embodiments, a heat treatment may be performed to remove non-ceramic materials from the foam body, that is, burn out/off the polymeric network and any other non-ceramic materials and thereby produce a ceramic body (brown body) having a highly porous microstructure. The drying process and the burn out processes are not particularly limited relative to time, temperature, or pressure and these parameters may be chosen by one of skill in the art.

At 220, the method 200 may include performing a sintering process on the ceramic body to densify and/or crystallize the remaining ceramic material(s). The sintering process is not particularly limited relative to time, temperature, or pressure and these parameters may be chosen by one of skill in the art. In various embodiments, the drying, burn out, and/or sintering processes may be performed in a single step. For example, the mold may be located in a heating device, such as an air furnace, and heated at one or more temperatures for one or more cycles to achieve the drying, burn out, and/or sintering.

At 222, the method 200 may include machining the ceramic body. The machining process is not particularly limited relative to any particular cutting or abrasion tool. In various embodiments, the machining process may include modifying the ceramic body to have a shape conformal to the surface of the substrate.

At 224, the method 200 may include providing a substrate and securing the ceramic body to a surface of the substrate to define at least one layer of the coating system thereon. The step of providing the substrate may include various processes of manufacturing the substrate (e.g., casting, machining, etc.) and/or preparing the substrate for securing the coating system thereto (e.g., etching, cleaning, etc.). The step of securing the ceramic body to the substrate may be performed by various processes. In various embodiments, the ceramic body may be bonded to the surface of the substrate with a bonding or adhesive material, such as a glass, braze, etc. In various embodiments, the ceramic body may be attached to the surface of the substrate by mechanical means, such as tabs/slots, tails/slots, pins, clips, etc. In various embodiments, the ceramic body may define a coating system or layer thereof having a thickness of greater than 0.5 millimeter, such as greater than 0.75 millimeter, such as greater than 1 millimeter.

In various embodiments, the method 200 may include forming a dense outer layer on the ceramic body configured to reduce a likelihood that fluids pass into the voids of the ceramic body and, potentially, contact the surface of the underlying substrate. In various embodiments, the dense outer layer may have little to no voids open at the surface thereof, and may be substantially or relatively impermeable to fluids, such as water vapor. In various embodiments, the dense outer layer may have a density of 95% or greater, such as 98% or greater. In various embodiments, the dense outer layer may have a thickness of 5 to 30 micrometers.

Various methods may be used to form the dense layer. In various embodiments, the dense outer layer may be defined by portions of the ceramic body that contacted inner surfaces of the mold during the foaming and curing of the mixture(s). In such embodiments, the dense outer layer may be retained during the machining step (step 222). In various embodiments, the dense outer layer may be formed by application of a sealing composition to the foam body or the ceramic body. In such embodiments, the sealing composition may be applied prior to or subsequent to securing the ceramic body to the substrate. Various sealing compositions may be used. In some embodiments, the sealing compositions may include an oxide material configured to promote steam resistance and/or thermal stability. In some embodiments, the sealing composition may include the same or similar material as the ceramic material of the first mixture. In one nonlimiting example, the ceramic material of the first mixture may be a disilicate material and the sealing composition may include a monosilicate material. In various embodiments, the dense outer layer may be formed by abrasion. In various embodiments, securing the ceramic body to the substrate may include orienting the ceramic body such that the dense outer layer defines an outermost surface of the ceramic body relative to the substrate.

The method 200 may end at 226.

In various embodiments, the microstructure of the TBC may be controlled by the choice of the polymeric foaming composition, the components of the polymeric foaming composition, and the concentration of such components. For example, a porosity, pore size distribution, density, or other property of one or more layers of the ceramic body may be controlled by selectively adjusting components and/or concentrations of components within the polymeric foaming composition(s), such as adjusting a type or a concentration of sintering aids, catalysts, surfactants, etc.

Figure 3:
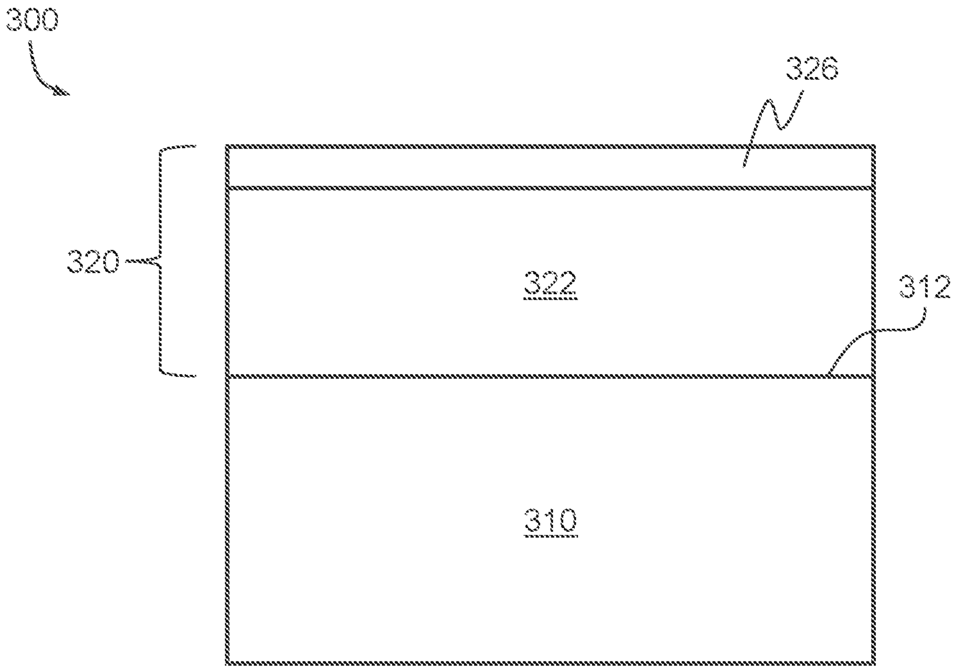
FIG. 3 is a cross-sectional view of a first component having a coating system thereon according to example embodiments of the present disclosure.
Figure 4:
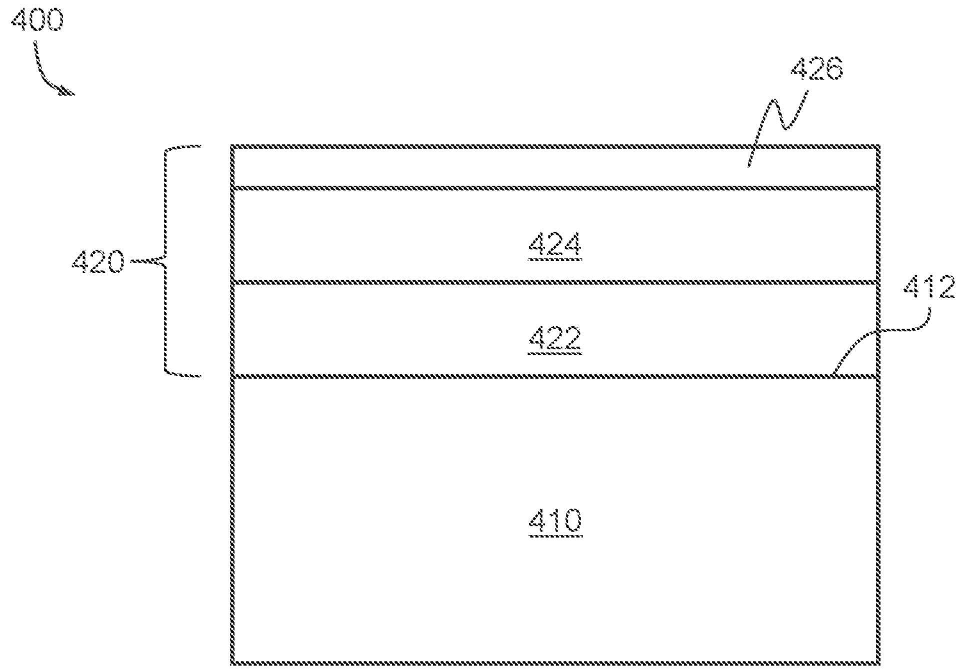
FIG. 4 is a cross-sectional view of a second component having a coating system thereon according to example embodiments of the present disclosure.

FIGS. 3 and 4 present exemplary components 300 and 400 having coating systems 320 and 420 thereon, respectively, in accordance with various aspects described herein. The coating systems 320 and 420 may be formed by the method 200 and have various layer compositions as described above. The components 300 and 400 and the coating systems 320 and 420 thereon, respectively, are merely exemplary and the components, coating systems, and methods disclosed herein are not limited to the examples of FIGS. 3 and 4.

Referring now to FIG. 3, a cross-sectional view of a portion of the exemplary component 300 is presented. The component 300 includes a substrate 310 having the coating system 320 secured and/or bonded to a surface 312 of the substrate 310. In this example, the coating system 320 defines a TBC configured to provide thermal protection to the underlying substrate 310. The coating system 320 includes a porous layer 322 and a dense layer 326 both formed of a ceramic material, such as a rare earth disilicate. The porous layer 322 has a porous microstructure and the dense layer 326 has a dense microstructure with little to no porosity. The component 300 may be produced by the steps 212 and 216-224 of the method 200.

Referring now to FIG. 4, a cross-sectional view of a portion of the exemplary component 400 is presented. The component 400 includes a substrate 410 having the coating system 420 secured and/or bonded to a surface 412 of the substrate 410. In this example, the coating system 420 defines a TBC configured to provide thermal protection to the underlying substrate 410. The coating system 420 includes a first porous layer 422, a second porous layer 424, and a dense layer 426 each formed of a ceramic material, such as a rare earth disilicate. The first porous layer 422 has a first microstructure, the second porous layer 424 has a second microstructure, and the dense layer 426 has a third microstructure. The first microstructure and the second porous microstructure may differ in porosity, pore size distribution, or other features. In one example, the first microstructure includes open cell porosity and the second microstructure includes closed cell porosity. The third microstructure may have little to no porosity. The component 400 may be produced by the steps 212-224 of the method 200.

In various embodiments, producing the component 400 may include locating a first mixture in the mold, subsequently locating a second mixture in the mold, and then simultaneously foaming and curing the first and second mixtures. In such embodiments, the first and second mixtures may include first and second polymeric foaming compositions, respectively, having different compositions, and the first microstructure may result from foaming of the first mixture and the second microstructure may result from foaming of the second mixture.

The components, coating systems, and methods disclosed herein provide various benefits over certain existing coating systems and methods. For example, certain methods for producing TBCs are expensive and may be limited in regard to the thickness of the TBC, for example, such as less than 15 mils (about 25 μm). In contrast, the methods disclosed herein are capable of producing TBCs having various shapes and thickness (e.g., greater than 1 mm) at relatively low cost. In addition, the coating systems disclosed herein provide significant shock resistant, low conductivity, capable of surviving operating environments in excess of 3100° F. (about 1705° C.), and are abradable. In embodiments that include a dense outer layer, the coating systems provide steam and fluid penetration resistance. Securing the ceramic body to the substrate post-sintering allows for increased sintering temperatures that would otherwise damage the substrate. The methods disclosed herein promote ease of controlling the resulting microstructure of the coating system layers through selection of the polymeric foaming composition.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, comprising:

locating a first mixture within a mold cavity defined by inner surfaces of a mold, the first mixture including a ceramic material and a first polymeric foaming composition;

locating a second mixture in the mold cavity, the second mixture including the ceramic material and a second polymeric foaming composition;

retaining the first mixture and the second mixture within the mold cavity for a period of time sufficient to allow the first mixture and the second mixture to simultaneously foam and cure and thereby produce a foam body having a shape defined by the mold cavity;

performing a one or more heat treatments to remove non-ceramic materials from the foam body and sinter the ceramic material to produce a ceramic body, wherein the ceramic body includes a first layer having a first microstructure resulting from foaming of the first mixture and a second layer having a second microstructure resulting from foaming of the second mixture;

performing a machining process to modify a size and/or a shape of the ceramic body; and securing the ceramic body to a substrate of a component to define at least a portion of a thermal barrier coating (TBC) on the substrate, wherein the component is configured to be installed in a gas turbine engine.

2. The method of claim 1, wherein the first microstructure and the second microstructure have different ranges of pore sizes.

3. The method of claim 1, wherein the first microstructure includes closed cell porosity, and the second microstructure includes open cell porosity.

4. The method of claim 1, wherein the foam body includes a dense outer layer formed by contact with the inner surfaces of the mold during foaming and curing of the first mixture, wherein securing the ceramic body to the substrate includes orienting the ceramic body such that the dense outer layer defines an outermost surface of the TBC relative to the substrate.

5. The method of claim 1, wherein the foam body includes a dense outer layer formed by application of a sealing composition to the ceramic body, wherein securing the ceramic body to the substrate includes orienting the ceramic body such that the dense outer layer defines an outermost surface of the TBC relative to the substrate.

6. The method of claim 1, wherein the ceramic material is a rare earth disilicate.

7. The method of claim 1, wherein the first polymeric foaming composition is a polyurethane foaming composition.

8. The method of claim 1, wherein securing the ceramic body to the substrate includes performing a bonding process with an adhesive material.

9. The method of claim 1, wherein the first microstructure and the second microstructure of the ceramic body are controlled by selection of components and concentrations of such components in the first polymeric foaming composition and the second polymeric foaming composition, respectively.

10. A method, comprising:

locating a first mixture within a mold cavity defined by inner surfaces of a mold, the first mixture including a ceramic material comprising a rare earth disilicate and a first polymeric foaming composition comprising a polyurethane foaming composition;

retaining the first mixture within the mold cavity for a period of time sufficient to allow the first mixture to foam and cure and thereby produce a foam body having a shape defined by the mold cavity;

performing one or more heat treatments to remove non-ceramic materials from the foam body and sinter the ceramic material to produce a ceramic body, wherein a microstructure of the ceramic body is based on the first polymeric foaming composition;

performing a machining process to modify a size and/or a shape of the ceramic body to have a shape conformal to a surface of a substrate; and securing the ceramic body to the surface of the substrate of a component to define at least a portion of a thermal barrier coating (TBC) on the substrate, wherein the component is configured to be installed in a gas turbine engine, wherein securing the ceramic body to the substrate includes bonding the ceramic body to the surface with bonding or adhesive material.

11. The method of claim 10, wherein the foam body includes a dense outer layer formed by either:

contact with the inner surfaces of the mold during foaming and curing of the first mixture, wherein securing the ceramic body to the substrate includes orienting the ceramic body such that the dense outer layer defines an outermost surface of the TBC relative to the substrate, or application of a sealing composition to the ceramic body;

wherein securing the ceramic body to the substrate includes orienting the ceramic body such that the dense outer layer defines an outermost surface of the TBC relative to the substrate.

12. The method of claim 11, wherein the dense outer layer is formed by application of the sealing composition, and the sealing composition includes a monosilicate material.

13. The method of claim 10, wherein the TBC has a thickness of greater than 1 millimeter.

14. The method of claim 10, wherein the TBC includes a plurality of interconnected unit cells having struts that have a relative density of greater than 98 percent and a closed cell porosity of 10 percent of greater.

15. The method of claim 10, wherein the TBC has a porosity gradient through a thickness thereof that increases in porosity with decreasing distance from the substrate.

16. A method, comprising:

locating a first mixture within a mold cavity defined by inner surfaces of a mold, the first mixture including a ceramic material and a first polymeric foaming composition;

retaining the first mixture within the mold cavity for a period of time sufficient to allow the first mixture to foam and cure and thereby produce a foam body having a shape defined by the mold cavity;

performing one or more heat treatments to remove non-ceramic materials from the foam body and sinter the ceramic material to produce a ceramic body, wherein a microstructure of the ceramic body is based on the first polymeric foaming composition;

performing a machining process to modify a size and/or a shape of the ceramic body; and securing the ceramic body to a substrate of a component to define at least a portion of a thermal barrier coating (TBC) on the substrate, wherein the component is configured to be installed in a gas turbine engine, wherein the TBC has a porosity gradient through a thickness thereof that increases in porosity with decreasing distance from the substrate, wherein the foam body includes a dense outer layer formed by either:

contact with the inner surfaces of the mold during foaming and curing of the first mixture, wherein securing the ceramic body to the substrate includes orienting the ceramic body such that the dense outer layer defines an outermost surface of the TBC relative to the substrate, or application of a sealing composition to the ceramic body;

wherein the dense outer layer has a density of 95% or greater and a thickness of 5 to 30 micrometers, wherein securing the ceramic body to the substrate includes orienting the ceramic body such that the dense outer layer defines an outermost surface of the TBC relative to the substrate.

17. The method of claim 16, wherein the dense outer layer is formed by application of the sealing composition, and the sealing composition includes a monosilicate material.

18. The method of claim 16, wherein the TBC has a thickness of greater than 1 millimeter.

19. The method of claim 16, wherein the TBC includes a plurality of interconnected unit cells having struts that have a relative density of greater than 98 percent and a closed cell porosity of 10 percent of greater.

* * * * *